United States Patent
Piccolo

(10) Patent No.: US 8,096,216 B2
(45) Date of Patent: Jan. 17, 2012

(54) CHAIN-TYPE FLEXIBLE CUTTING EDGE

(76) Inventor: Michele Piccolo, Turin (IT)

( * ) Notice: Subject to any disclaimer, the term of this patent is extended or adjusted under 35 U.S.C. 154(b) by 0 days.

(21) Appl. No.: 12/574,433

(22) Filed: Oct. 6, 2009

(65) Prior Publication Data
US 2010/0050442 A1  Mar. 4, 2010

Related U.S. Application Data

(63) Continuation of application No. PCT/IT2007/000265, filed on Apr. 10, 2007.

(51) Int. Cl.
*A01G 3/06* (2006.01)
(52) U.S. Cl. .................. 83/13; 30/276; 30/381; 83/830; 56/12.7
(58) Field of Classification Search ............ 83/830–834, 83/955; 30/381, 276, 353; 56/12.7
See application file for complete search history.

(56) References Cited

U.S. PATENT DOCUMENTS

| | | | |
|---|---|---|---|
| 789,512 A * | 5/1905 | Waller | 83/830 |
| 1,467,150 A * | 9/1923 | Frere | 83/830 |
| 2,676,448 A | 4/1954 | Limberger | |
| 2,691,262 A | 10/1954 | Swertfeger | |
| 3,237,388 A | 3/1966 | Rishovd et al. | |
| 3,453,732 A | 7/1969 | Wilkin | |
| 4,077,190 A | 3/1978 | Crites | |
| 4,631,828 A | 12/1986 | Burnett | |
| 4,744,148 A | 5/1988 | Brown | |
| D303,067 S | 8/1989 | Pinson et al. | |
| 4,881,438 A | 11/1989 | Pinney | |
| 5,048,389 A | 9/1991 | Carlton | |
| 5,201,350 A | 4/1993 | Milbourn | |
| 5,293,916 A * | 3/1994 | Kucherry, Sr. | 144/208.7 |
| D347,150 S | 5/1994 | Falconbridge | |
| 6,161,292 A | 12/2000 | Morabit et al. | |
| 6,401,585 B1 * | 6/2002 | Morgan | 83/835 |
| 6,427,341 B1 * | 8/2002 | Lee | 30/347 |
| D574,679 S | 8/2008 | Denby | |
| 7,882,774 B1 | 2/2011 | Bernardy | |

FOREIGN PATENT DOCUMENTS
FR  2651089 A1  3/1991

OTHER PUBLICATIONS
PCT/ISA/210 (ISR) issued in PCT/IT2007/000265, Oct. 12, 2007, Michele Piccolo.
PCT/ISA/237 (Written Opinion) Issued in PCT/IT07/000265, Oct. 12, 2007, Michele Piccolo.

* cited by examiner

*Primary Examiner* — Kenneth E. Peterson
(74) *Attorney, Agent, or Firm* — Edwards Wildman Palmer LLP; Peter C. Lauro, Esq.; Brian R. Landry, Esq.

(57) ABSTRACT

A chain-type flexible cutting edge, particularly for bush-cutter is described, comprising at least one linear connecting and cutting link (3) and at least one toothed connecting and cutting link (5) mutually connected in an articulated manner in order to have a smooth cutting-start edge ($T_L$) and a toothed cutting-start edge ($T_D$).

18 Claims, 2 Drawing Sheets

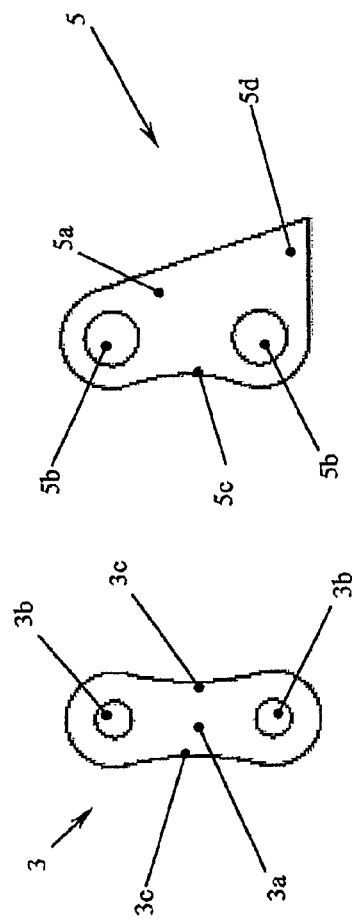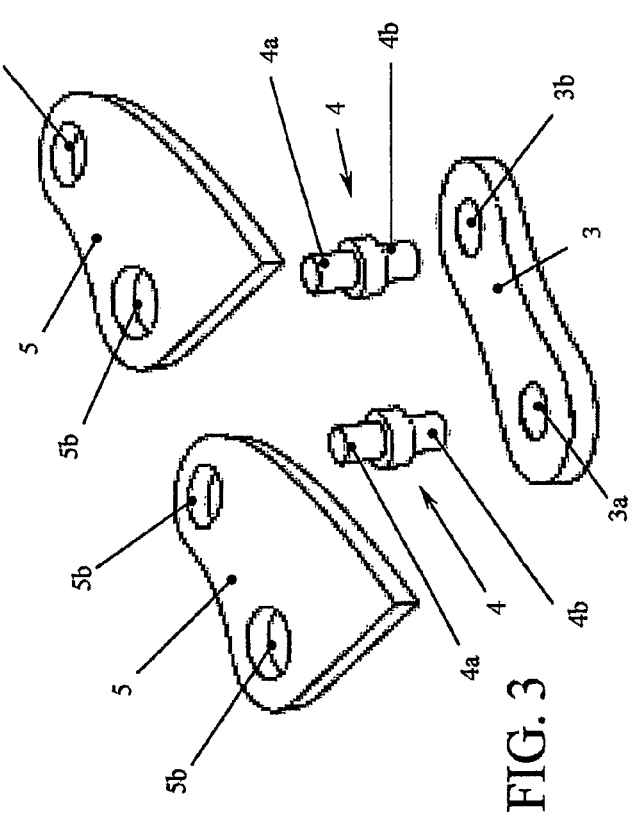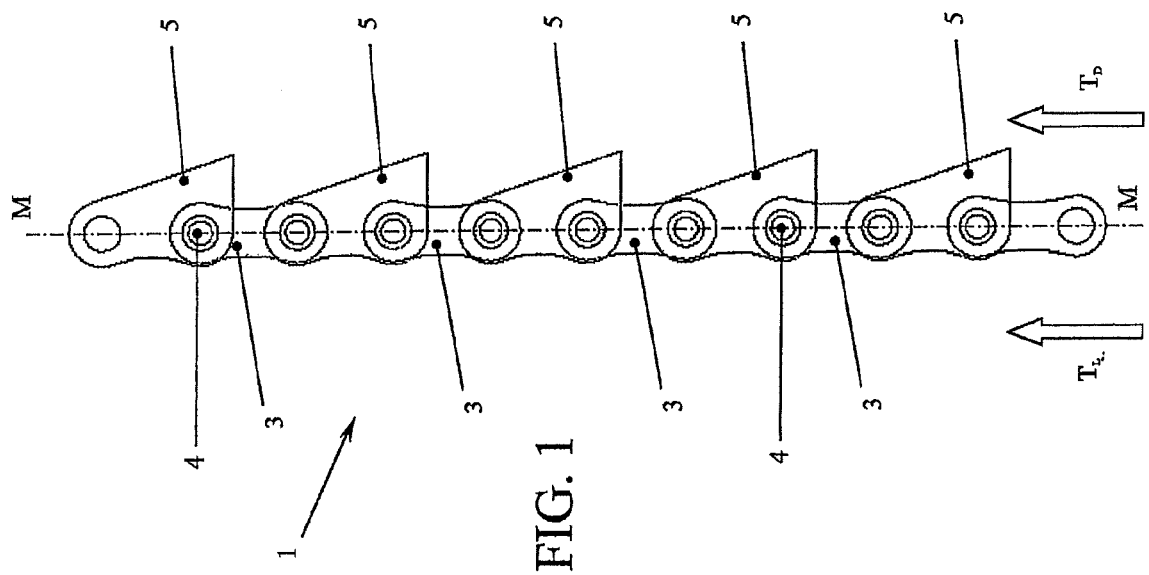
FIG. 2b
FIG. 2a
FIG. 3
FIG. 1

CHAIN-TYPE FLEXIBLE CUTTING EDGE

RELATED APPLICATION

This application is a continuation pursuant to 35 U.S.C. §111 of PCT international application Ser. No. PCT/IT2007/000265, filed Apr. 10, 2007, designating the United States and published in English on Oct. 16, 2008 as publication WO 2008/123000 A1. The entire disclosure of the aforementioned patent application is incorporated herein by this reference.

BACKGROUND OF THE INVENTION

1. Field of the Invention

The present invention refers to a chain-type flexible cutting edge, in particular for bush-cutters.

2. Background Art

As known, the bush-cutter is a tool used for cutting bushes, shrubs and grass in places not accessible with other machines. It is carried on straps or on the shoulders by an operator and is equipped with an engine of the electric or combustion type that, through a transmission shaft placed inside a rod, actuates, by rotating it, a rigid toothed disk or a mowing head that usually supports from two to four flexible cutters, made as nylon wires, thin metal cables or chains.

In the particular case of mowing heads, the chains used as flexible cutting edges usually are of three types:

chains with normal, ring-type links connected to the head at only one of their ends: such chains, given their shape, have a scarce flexibility, and therefore tend to brake when they encounter a particularly hard obstacle. When this occurs, the operator must stop his mowing work, disassemble the mowing head and replace the chain. Not rarely such inconvenience occurs rather frequently during the mowing work, and it is clear therefore that these continuous interruptions bring about unpleasant losses of time, in addition to an unavoidable frustration for the operator. Moreover, such chains are not suitable for cutting trees or plants with wooden stock with large diameters;

plane roller-type chains connected to the head at only one of their ends (like those described, for example, in U.S. Pat. No. 2,676,448 in the name of LIMBERGER Frank W., in FR-A-2 651 089 in the name of DECOSTANZI Arnold, and in U.S. Pat. No. 4,631,828 in the name of BURNET Robert J.: such chains have a higher flexibility than the previous ones, but they are also unsuitable for cutting trees and plants with wood stocks with large diameters; and toothed roller-type chains connected to the head at both their ends in order to form a ring: such chains are adapted for cutting trees and plants with wood stocks with large diameters, but not grass and thinner shrubs, that instead of being cut, are torn. In such case, it is therefore necessary to exchange the mowing head with another one equipped with a different type of cutting edge. Moreover, it is their ring-type structure that also makes them scarcely flexible and therefore subjected to frequent breakages in case of impacts against hard obstacles.

SUMMARY OF THE INVENTION

Object of the present invention is solving the above prior art problems, by providing a chain-type flexible cutting edge, particularly for a bush-cutter, that is equipped both with a smooth cutting-start edge, suitable for example for mowing grass or thin shrubs, and with a toothed cutting-start edge suitable for example for pruning bushes or for cutting trees or plants whose stock has a small diameter.

Moreover, an object of the present invention is providing a chain-type flexible cutting edge that is more flexible and resistant with respect to prior art chain-type cutting edges.

Another object of the present invention is providing a mowing head equipped with a chain-type flexible cutting edge according to the present invention.

A further object of the present invention is providing a bush-cutter equipped with a mowing head according to the present invention.

The above and other objects and advantages of the invention, as will appear from the following description, are obtained by a chain-type flexible cutting edge as claimed in claim 1. Moreover, the above and other objects and advantages of the invention are obtained by a mowing head equipped with the above chain-type flexible cutting edge and by a bush-cutter equipped with such mowing head. Preferred embodiments and non-trivial variations of the present invention are the subject matter of the dependent claims.

BRIEF DESCRIPTION OF THE DRAWINGS

The present invention will be better described by some preferred embodiments thereof, provided as a non-limiting example, with reference to the enclosed drawings, in which:

FIG. 1 shows a side view of a preferred embodiment of the chain-type flexible cutting edge according to the present invention;

FIG. 2a shows a plan view of a type of link composing the chain-type flexible cutting edge of FIG. 1;

FIG. 2b shows a plan view of another type of link composing the chain-type flexible cutting edge of FIG. 1;

FIG. 3 shows an exploded perspective view of a length of the chain-type flexible cutting edge of FIG. 1.

DETAILED DESCRIPTION OF CERTAIN EMBODIMENTS OF THE INVENTION

Figure 4:
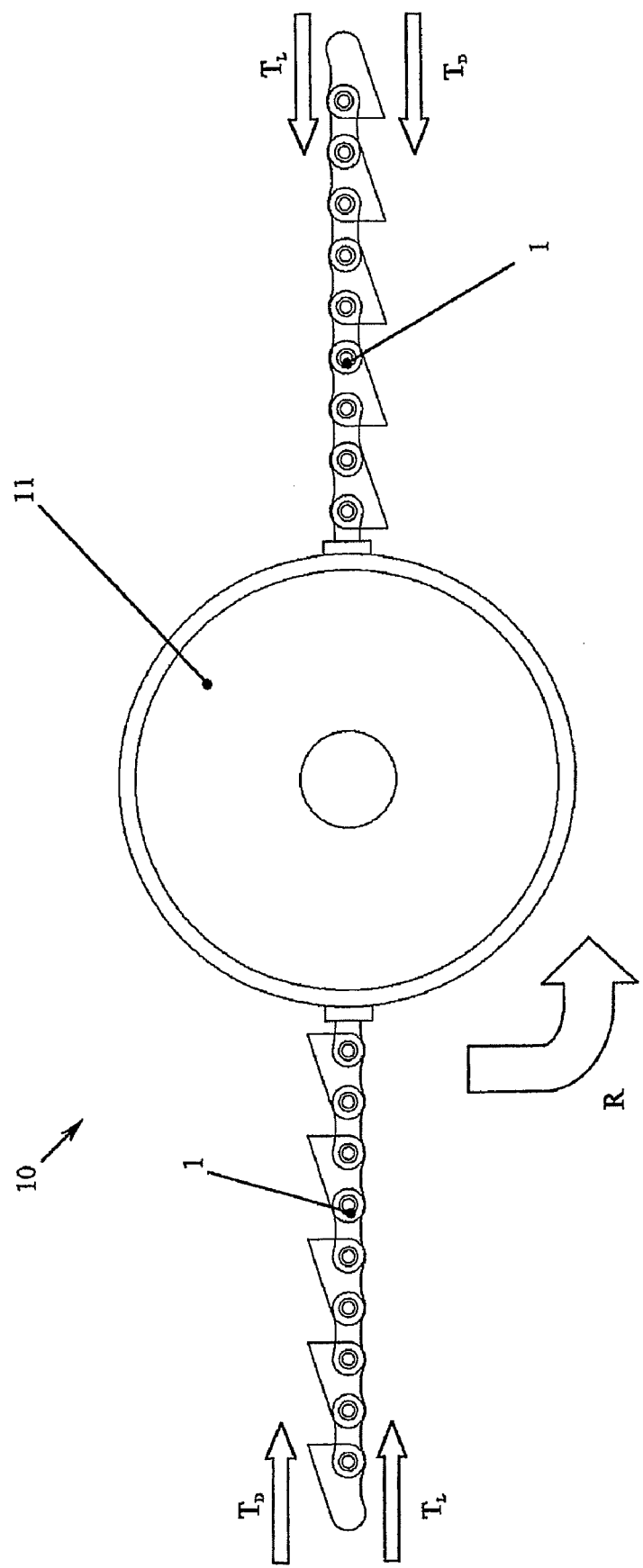
FIG. 4 shows a plan view of a mowing head according to the present invention equipped with two chain-type flexible cutting edges of FIG. 1.

With reference to the Figure, it is possible to note that the chain-type flexible cutting edge 1 according to the present invention is the articulated joining, preferably according to the configuration of a roller-type chain, of at least two different links: in particular, the chain-type flexible cutting edge 1 therefore comprises at least one linear connecting and cutting link 3 and at least one toothed connecting and cutting link 5 mutually connected in an articulated manner. In a preferred embodiment thereof, and as can be noted in particular in FIG. 1, the chain-type flexible cutting edge 1 according to the present invention is therefore formed by an articulated, and preferably alternate, joining of linear connecting and cutting linear 3 and toothed connecting and cutting links 5. The number of such mutually connected links 3, 5 is obviously a function of the length that has to be conferred to the cutting edge 1 according to the present invention.

With reference to FIG. 2a, it is possible to note that a linear connecting and cutting link 3 is composed of a plate 3a equipped with at least one connecting hole 3b for the articulated connection with at least one nearby link; in particular, the plate 3a is equipped with a perimeter edge 3c with linear behaviour. In the particular case in which the linear connecting and cutting link 3 is aimed to be the last component of the cutting edge 1 chain, the presence of a single connecting hole 3b is advisable. Instead, if the linear connecting and cutting link 3 is an intermediate component of the cutting edge 1 chain, it is clear that it must be equipped with at least two connecting holes 3b, respectively one for the articulated connection with another upstream link and the other for the articulated connection with another downstream link.

With reference to FIG. 2b, it is possible to note that a toothed connecting and cutting link 5 is composed of a plate 5a equipped with at least one connecting hole 5b for the articulated connection with at least one nearby link; in particular, the plate 5a is equipped with a first perimeter edge 5c with linear behaviour and with a second edge equipped with at least one cutting tooth 5d. Obviously, the cutting tooth 5d can have any shape suitable for the purposes of the present invention: in particular, the cutting tooth 5d can have a semi-round, squared, hook shape or, preferably and as shown in the Figures, a ramp shape. Similarly to what is stated above, in the particular case in which the toothed connecting and cutting link 5 is aimed to be the last component of the cutting edge 1 chain, the presence of a single connecting hole 5b is advisable. Instead, if the toothed connecting and cutting link 5 is an intermediate component of the cutting edge 1 chain, it is clear that it must be equipped with at least two connecting holes 5b, respectively one for the articulated connection with another upstream link and the other for the articulated connection with another downstream link.

With reference in particular to FIG. 3, it is possible to note that, preferably, the articulated connection between links 3, 5 occurs through pins 4, each pin 4 having a first end 4a adapted to be inserted in a connecting hole 5b of a toothed connecting and cutting link 5 and a second end 4b adapted to be inserted in a connecting hole 3b of a linear connecting and cutting link 3. For the movable fastening of the ends 4a, 4b of the pins 4 inside the respective connecting holes 3b, 5b, such ends can be riveted once being inserted in the holes themselves, or other known techniques can be used, such as for example locking through clips (not shown).

The arrangement of links 3, 5 along the chain-type flexible cutting edge 1 according to the present invention is therefore advantageously such as to arrange all toothed connecting and cutting links 5 in such a way that they have, with respect to a median axis M-M of the cutting edge, their own cutting teeth 5d all on the same side. In such a way, the chain-type flexible cutting edge 1 is simultaneously equipped with a smooth cutting-start edge $T_L$ (in FIG. 1, the one on the left of the median axis M-M) and a toothed cutting-start edge $T_D$ (in FIG. 1, the one on the right of the median axis M-M). Though the preferred embodiment of the cutting edge 1 according to the present invention has been shown as an example as alternate connection of a toothed connecting and cutting link 5 and a linear connecting and cutting link 3, it is wholly clear that their arrangement can be different, being able to provide, for example depending on particular working needs, a different alternance between links 3, 5 (for example two or more linear connecting and cutting links and one toothed connecting and cutting link 5 in order to increase the distance between cutting teeth 5d and make the cutting edge 1 less biting).

Therefore, by abandoning the chain structure with ring-shaped links, the chain-type flexible cutting edge 1 according to the present invention has therefore a flexibility, and consequently a reliability to breakage, that is greater than what has been known in the art so far, since it has not the structural stiffening phenomenon any more in case of impact against hard obstacles.

With reference now to FIG. 4, it is possible to note a preferred embodiment of the mowing head 10 according to the present invention. Such head 10 is composed of a central body 11 to which an end of at least one flexible cutting edge 1 is perimetrally connected, through the most adequate and commonly known mechanical connecting means, such as bolts or screws. The head 10 is then equipped with connecting means to a drive shaft of a bush-cutter, also in this case through one of the substantially known connecting means. It is wholly evident that, even if due to obvious balancing reasons when rotating the head 10, it is advisable to connect thereto at least two cutting edges 1 arranged diametrally opposite, the number and arrangement of the cutting edges 1 can be different from those shown here.

Taking into account an example of rotation direction of the head 10, shown in FIG. 4 by arrow R, it is clear that advantageously the flexible cutting edge 1 can be used according to two different modes. In fact, by connecting the cutting edge 1 as shown in FIG. 4, during rotation R, the cutting edge 1 has upon cutting the smooth cutting-start edge $T_L$, particularly adapted for mowing grass or thin shrubs, and generally for finishing works. By inverting, instead, the connection direction of the cutting edge 1 to the head 10, the cutting edge 1 itself has upon cutting its toothed cutting-start edge $T_D$, particularly adapted for cutting trees or plants with a stock with a small diameter.

It is clear that an operator, every time different working needs occur, can at any time modify the connection modes of the flexible cutting edge 1 to the head 10 in order to exploit, when choosing it and indifferently, the smooth cutting-start edge $T_L$ or the toothed cutting-start edge $T_D$.

The present invention further comprises a bush-cutter equipped with the cutting head 10 with chain-type flexible cutting edge 1 as previously described.

Incorporation by Reference

The contents of all references (including literature references, issued patents, published patent applications, and co-pending patent applications) cited throughout this application are hereby expressly incorporated herein in their entireties by reference.

Equivalents

Those skilled in the art will recognize, or be able to ascertain using no more than routine experimentation, many equivalents of the specific embodiments of the invention described herein. Such equivalents are intended to be encompassed by the following claims.

We claim:
1. A cutting head comprising:
a central body; and
at least one flexible cutting chain having a first end detachably coupled to the central body and having a second free end radially spaced from the central body, each of the at least one flexible cutting chains comprising:
a plurality of linear connecting and cutting links; and
a plurality of toothed connecting and cutting links;
wherein the plurality of linear connecting and cutting links and the plurality of toothed connecting and cutting links are arranged so as to provide a smooth cutting edge on a first side of the cutting chain and a toothed cutting edge on a second side of the cutting chain; and
wherein each of the toothed connecting and cutting links includes a ramp-shaped cutting tooth, each of the ramp-shaped cutting teeth culminating in a point and each of the points located on an end of the toothed connecting and cutting links proximate to the central body.

2. The cutting head of claim 1, wherein the plurality of linear connecting and cutting links and the plurality of toothed connecting and cutting links are mutually interposed.

3. The cutting head of claim 1, wherein each of the plurality of linear connecting and cutting links and each of the plurality of toothed connecting and cutting links includes at least one connecting hole for articulated connection with at least one adjacent link.

4. The cutting head of claim 3, wherein the at least one flexible cutting chain further comprises a plurality of pins received within the connecting holes to form articulated connections between adjacent links.

5. The cutting head of claim 1, wherein the cutting head comprises a plurality of flexible cutting chains.

6. The cutting head of claim 5, wherein the cutting head comprises two flexible cutting chains.

7. The cutting head of claim 6, wherein the two flexible cutting chains are positioned diametrically opposite on the central body.

8. A bush cutter comprising:
an engine;
a drive shaft coupled to the engine; and
a cutting head coupled to the drive shaft, the cutting head comprising:
a central body; and
at least one flexible cutting chain having a first end detachably coupled to the central body and having a second free end radially spaced from the central body, each of the at least one flexible cutting chains comprising: a plurality of linear connecting and cutting links; and a plurality of toothed connecting and cutting links;
wherein the plurality of linear connecting and cutting links and the plurality of toothed connecting and cutting links are arranged so as to provide a smooth cutting edge on a first side of the cutting chain and a toothed cutting edge on a second side of the cutting chain; and
wherein each of the toothed connecting and cutting links includes a ramp-shaped cutting tooth, each of the ramp-shaped cutting teeth culminating in a point and each of the points located on an end of the toothed connecting and cutting links proximate to the central body.

9. The bush cutter of claim 8, wherein the plurality of linear connecting and cutting links and the plurality of toothed connecting and cutting links are mutually interposed.

10. The bush cutter of claim 8, wherein each of the plurality of linear connecting and cutting links and each of the plurality of toothed connecting and cutting links includes at least one connecting hole for articulated connection with at least one adjacent link.

11. The bush cutter of claim 10, wherein the at least one flexible cutting chain further comprises a plurality of pins received within the connecting holes to form articulated connections between adjacent links.

12. The bush cutter of claim 8, wherein the cutting head comprises a plurality of flexible cutting chains.

13. The bush cutter of claim 12, wherein the cutting head comprises two flexible cutting chains.

14. The bush cutter of claim 13, wherein the two flexible cutting chains are positioned diametrically opposite on the central body.

15. A method of cutting vegetation, the method comprising:
rotating the a cutting head in a rotation direction to cause the a flexible cutting chain to cut the vegetation, the cutting head comprising:
a central body; and
at least one flexible cutting chain having a first end detachably coupled to the central body and having a second free end radially spaced from the central body, each of the at least one flexible cutting chains comprising:
a plurality of linear connecting and cutting links; and
a plurality of toothed connecting and cutting links;
wherein the plurality of linear connecting and cutting links and the plurality of toothed connecting and cutting links are arranged so as to provide a smooth cutting edge on a first side of the cutting chain and a toothed cutting edge on a second side of the cutting chain; and
wherein each of the toothed connecting and cutting links includes a ramp-shaped cutting tooth, each of the ramp-shaped cutting teeth culminating in a point and each of the points located on an end of the toothed connecting and cutting links proximate to the central body;
thereby cutting the vegetation.

16. The method of claim 15, further comprising:
decoupling the at least one flexible cutting chain from the central body of the cutter head;
detachably recoupling the at least one flexible cutting chain to the central body of the cutter head such that an opposite side of the at least one flexible cutting chain is a leading edge of the at least one flexible cutting chain when the cutter head is rotated in the rotation direction.

17. The method of claim 16, wherein flexible cutting chain is recoupled so that the smooth cutting edge of the flexible cutting chain is the leading edge of the flexible cutting chain, and wherein the vegetation is grass or thin shrubs.

18. The method of claim 16, wherein flexible cutting chain is recoupled so that the toothed cutting edge of the flexible cutting chain is the leading edge of the flexible cutting chain, and wherein the vegetation is a tree.

* * * * *